United States Patent [19]

Urruti

[11] Patent Number: 4,848,869

[45] Date of Patent: Jul. 18, 1989

[54] METHOD OF COATING AND OPTICAL FIBER COMPRISING POLYIMIDE-SILICONE BLOCK COPOLYMER COATING

[75] Inventor: Eric H. Urruti, Corning, N.Y.

[73] Assignee: Corning Incorporated, Corning, N.Y.

[21] Appl. No.: 229,443

[22] Filed: Aug. 8, 1988

[51] Int. Cl.[4] ..................... C08F 283/00; D02G 3/00
[52] U.S. Cl. .................................. 350/96.33; 65/3.41; 65/3.43; 65/3.44; 65/11.1; 118/689; 118/690; 427/163
[58] Field of Search ........................ 65/3.4, 3.41, 3.43, 65/3.44, 11.1; 427/163; 118/689, 690; 428/391; 350/96.33, 96.23

[56] References Cited

U.S. PATENT DOCUMENTS

| | | | |
|---|---|---|---|
| 3,556,754 | 1/1971 | Marsden et al. | 65/3.41 |
| 3,980,390 | 9/1976 | Yamamoto et al. | 350/96 WG |
| 4,114,981 | 9/1978 | Ishida et al. | 350/96.33 |
| 4,270,840 | 6/1981 | Uchida et al. | 350/96.34 |
| 4,531,959 | 7/1985 | Kar et al. | 65/3.11 |
| 4,637,956 | 1/1987 | Das et al. | 65/3.41 X |
| 4,690,997 | 9/1987 | Cella et al. | 528/26 |
| 4,733,941 | 3/1988 | Broer et al. | 350/96.33 |
| 4,758,637 | 7/1988 | Merrifield et al. | 428/391 X |

FOREIGN PATENT DOCUMENTS 0204160 12/1986 European Pat. Off. .
2046625 7/1980 United Kingdom ............. 350/96.33

OTHER PUBLICATIONS

S. Kilic et al., "Linear Thermal Expansion and Extension Coefficients of Various Polyimide Films by Using A Thermomechanical Analyzer," *Polymer Preprints*, 28 (2) 212-213 (1987).

C. A. Arnold et al., "Structure-Property Relationship of Polyimide Silioxane Copolymers Prepared by Bulk and Solution Imidization Techniques," *Polymer Preprints*, 28 (2) 217-219 (1987).

C. A. Arnold et al., "Polyimide Homopolymers and Polyimide-Polysiloxane Segmented Copolymers: Influence of Synthesis and Compositional Variables on Solubility Characteristics," *Polymer Preprints*, 29 (1) 349-351 (1988).

Primary Examiner—Arthur Kellogg
Attorney, Agent, or Firm—Kees van der Sterre

[57] ABSTRACT

A silicone-based composite coating system for a glass optical fiber, the system comprising a silicone polymer undercoating component and a silicone-polyimide block copolymer overcoating component, is provided. The coating system can be applied entirely on-line, improves the handling characteristics of the fibers over conventional silicone-coated fibers, offers an excellent combination of optical and elastic properties, and does not compromise the high-temperature operating characteristics of silicone-based coating systems.

9 Claims, 1 Drawing Sheet

METHOD OF COATING AND OPTICAL FIBER COMPRISING POLYIMIDE-SILICONE BLOCK COPOLYMER COATING

BACKGROUND OF THE INVENTION

The present invention relates to optical fibers provided with protective polymer coatings, and particularly to glass optical fibers which include a composite coating comprising an inner layer of a silicone polymer and an outer layer of a polyimide-silicone block copolymer.

It is well known to coat glass optical fibers with protective organic coatings as the glass fibers are drawn from a glass melt or solid glass preform. Glass fibers as drawn exhibit very high tensile strength, but are substantially weakened by the development of surface flaws on the surface of the fiber. Thus the application of a protective coating to the surface of the fiber before it comes into contact with any solid surface can largely preserve the inherent high strength thereof.

A number of different coating systems have been used commercially for the production of glass optical waveguide fibers for optical telecommunications. However only two coating systems are presently in widespread commercial use. The first of these systems employs coating materials which are rapidly curable by exposure to ultraviolet light. Examples of such coatings are the UV-curable urethane acrylates, representative compositions for these coatings being described in European Patent No. EP0204160.

Another commercially utilized coating system for glass optical fibers for telecommunications employs a primary or first-applied coating of a silicone polymer and a secondary coating or jacket of an extruded thermoplastic polymer such as nylon. U.S. Pat. No. 4,114,981 describes an optical coating system of this type.

UV-curable acrylate coating systems provide acceptable service in applications over a relatively broad range of ambient temperatures, but are not sufficiently stable to withstand elevated temperatures for prolonged period of use. Silicone coatings are more commonly used in aggressive environments involving prolonged exposure to high temperatures, but these coatings have the disadvantage of high cost.

Fast-cure silicone resins of the kind used for optical fiber coating do not cure as rapidly as the commercial UV-curable resins, and are also somewhat more difficult to handle due to a tacky surface quality in the cured state. Thus silicone-coated fibers are generally coated at lower speeds, tend to pick up dust and dirt after coating, and often are difficult to unwind for cabling or other processing.

Because of these factors, silicone-coated fibers are normally overcoated by extrusion with a thermoplastic jacketing material prior to final testing and shipment. This typically involves off-line extrusion processing, and the tough jacketing materials used require proof testing of the jacketed fiber at unusually high stresses to assure detection of breaks. Both of these procedures add significant cost to the fiber.

Nevertheless, there are some applications for which fiber having high-temperature operating capability is needed, and for these applications, silicone-based coating formulations offer a clear advantage over acrylate-coated fibers. At least for these uses, a silicone coating system which could be applied rapidly and, most preferably without the need for offline jacketing and high-stress proof testing would have significant commercial importance.

SUMMARY OF THE INVENTION

In accordance with the present invention, a new silicone-based composite coating system is provided which offers the advantages of silicones in terms of extended high temperature capability, but overcomes the various disadvantages of silicones from a cost and manufacturing standpoint. The combination coating has a silicone polymer undercoating component or layer, yet can be applied entirely on-line, i.e., without any need for fiber rewinding or other reprocessing of the fiber, such as the off-line extrusion overcoating of the fiber practiced in the prior art. Further, the overcoating component or layer of the combination coating has excellent handling characteristics and compatibility with the underlying silicone layer.

The combination coating system offering the described advantages is a system comprising a silicone polymer underlayer covered with an overcoated layer of a polyimide-silicone block copolymer. Polyimide-silicone block copolymers offer excellent adhesion to silicone undercoating compositions, perhaps due to the presence of silicone blocks in the block copolymer. This good adhesion and the absence of tackiness in the overcoating insure ease of handling in manufacture.

Further, the elastic properties of the combination coating are such that proof testing of the fiber does not have to be conducted at artificially high stress levels. Thus proof test stresses are governed by fiber rather than coating characteristics.

And finally, the composite coating offers the described advantages without compromising the desirable high-temperature operating characteristics of the fiber. Thus the high-temperature capabilities of the block copolymer component equal or exceed those of the silicone component of the coating system.

In one aspect, then, the invention comprises a glass optical fiber having at least two protective polymer coatings disposed on the outer surface thereof, those coatings including at least one silicone-polyimide block copolymer layer and one silicone polymer layer. The silicone layer forms an underlayer for the silicone-polyimide block copolymer, being positioned interiorly of the copolymer and in contact therewith. The silicone polyimide layer forms an outer layer or overcoat on the silicone polymer underlayer.

In another aspect, the invention comprises an improvement in a silicone-coated optical fiber which, conventionally, comprises an optical fiber composed of a glass and one or more polymer coatings on the optical fiber, with least one of the coatings consisting of a silicone polymer. In accordance with the invention, there is provided on the optical fiber, in place of or in addition to the silicone coating, a composite coating consisting essentially of a silicone polymer underlayer and a silicone-polyimide block copolymer covering layer. It is the combination of these layers which provides the unique characteristics and advantages of the composite coatings and optical fibers of the invention.

In yet another aspect, the invention includes a method for treating silicone-coated optical fibers to improve the handling and optical transmission characteristics thereof. In accordance with that method, the silicone-coated optical fiber is provided with an overcoat layer consisting essentially of a silicone-polyimide block copolymer layer, this latter layer being directly adjacent the silicone layer and in contact therewith. Most preferably, the overcoat layer is applied immediately after the application of the silicone coating and prior to contact of the silicone-coated fiber with any solid or liquid material other than the block copolymer overcoat material.

Following the application of a silicone-polyimide block copolymer overcoating, the thus-coated optical fiber can conveniently be wound, proof-tested, cabled, or otherwise handled without the need to take special precautions to avoid the various problems associated with the undesirable handling characteristics of silicone-coated fibers.

DESCRIPTION OF THE DRAWING

The invention may be further understood by reference to the drawing wherein.

DETAILED DESCRIPTION

The glass optical fiber to be provided with the combination coating in accordance with the invention may be of any conventional type. Hence glass optical fibers with glass claddings and relatively large glass cores, typically referred to as multimode optical fibers, or similar glass fibers with small cores, conventionally designated single mode fibers, may be used. In some cases, the use of the combination coating of the invention to coat unclad fused silica fibers for fiber optic use may also be advantageous. Particularly preferred are optical fibers of the type described in the copending, commonly assigned U.S. patent application of G. Kar entitled "Coated Optical Waveguide Fiber," Ser. No. 103,032 filed Sept. 30, 1987 and commonly assigned herewith. These are fibers comprising a thin outer layer of a high index glass which optically isolates the fiber from the coating. This feature permits even low-refractive-index silicone polymers to be directly applied to the fiber without risk of degrading optical performance.

Figure 1:
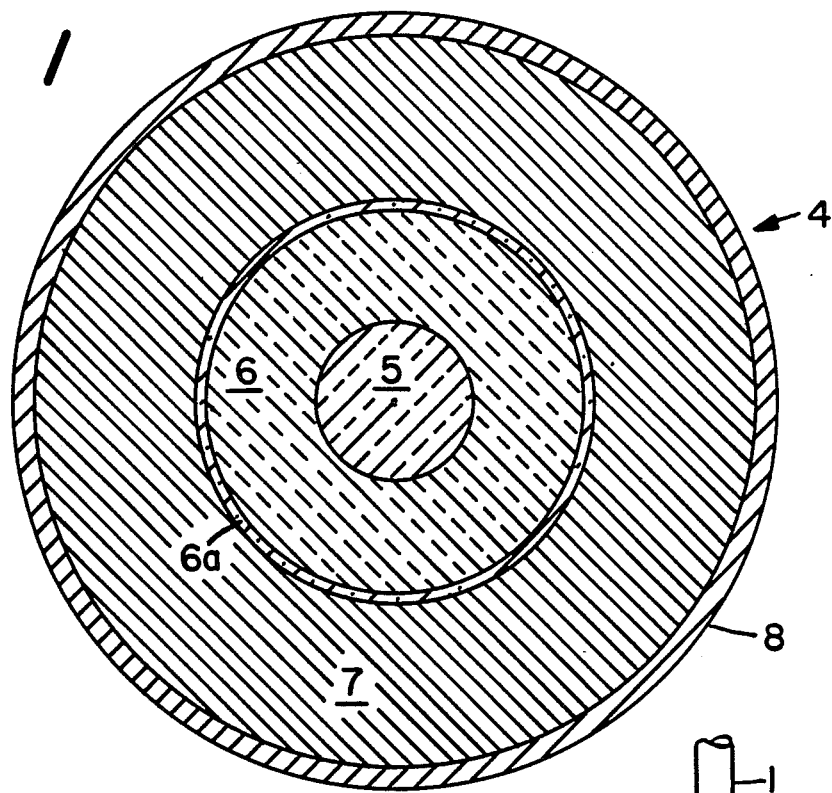
FIG. 1 is a schematic cross-sectional illustration, not in true proportion or to scale, of a glass optical fiber provided with a combination coating in accordance with the invention.

FIG. 1 of the drawing schematically illustrates a cross-sectional view of a preferred optical fiber provided in accordance with the invention. As shown in FIG. 1, coated optical fiber 4 includes glass core 5 and glass cladding 6, the cladding comprising outer glass layer 6a of high refractive index glass which optically isolates the fiber from the fiber coating. Disposed on the outer glass layer 6a is the composite coating consisting of silicone underlayer 7 and silicone-polyimide block copolymer covering layer 8. In combination, these polymer layers impart good physical protection and excellent resistance to high temperature deterioration.

Of course the optical fiber may, prior to the application of the silicone coating thereto, be provided with one or more other primary coatings of plastic or inorganic materials if desired. Thus, for example, an inorganic hermetic coating may be first applied to the fiber to protect the fiber from the effects of moisture or other potentially harmful vapor materials.

The silicone coating to be applied to the optical fiber to be coated in accordance with the invention may be selected from among any of the silicone polymer materials known in the art and useful for this purpose. Most typically, these are two-package polymer systems wherein curing is by silica hydride addition to an alkene, (commonly referred to as silica hydride addition polymers), and are substantially free of inert liquid solvents or diluents (100% solids systems). Examples of such polymer systems are the RTV (room temperature vulcanizing) silicones, e.g., those commercially available from the General Electric Company as RTV-615 and RTV-655 silicone polymers and from the Dow Corning Corporation as Sylgard TM 184 and Sylgard TM 182 silicone polymers.

Similarly, silicone-polyimide block copolymer compositions of commercially available type may be used to provide the overcoating for the silicone polymer layer. These known materials, described for example in U.S. Pat. No. 4,690,997, have been used in the prior art as flame retardant wire-coating compositions. A commercially available material of this type is Siltem TM Copolymer 87-73, obtainable from the General Electric Company, Waterford, N.Y.

Conventional fiber coating dies may be used to sequentially apply these coating materials to the optical fiber. The presently preferred die is a pressure coating die such as described in U.S. Pat. No. 4,531,959, which can apply liquids to glass optical fibers at high speeds and at controlled thickness.

Silicone polymers useful for the coating of optical fibers are, as noted, chemically curing resin systems, and therefore curing of the silicone underlayer is achieved by passing the silicone coated fiber through an oven wherein it can be rapidly heated to curing temperature. Since these are most frequently solvent-free formulations, solvent volatilization and bubbling of the coating do not present problems.

Commercially available silicone-polyimide block copolymers are applied as one-part systems, conveniently by diluting the neat resin to coating viscosity with a liquid solvent, and then curing the coating on the fiber by evaporating the solvent therefrom. Again, the coated fiber is passed through an oven to achieve the desired cure, with heating being at a rate sufficient to remove the solvent without bubbling the coating. The appropriate oven temperature and temperature profile to achieve this result can readily be determined for any selected coating formulation by routine experimentation.

Alternatively, the silicone-polyimide block copolymer could of course be applied in solvent-free form by hot melt coating or melt extrusion techniques. This approach would normally be preferred where relatively thick polyimide coatings are required.

The two-package silicone polymer to be supplied to the coater for application to the fiber may if desired be premixed and used in a batch mode in accordance with conventional practice. This normally involves thoroughly mixing the two coating components, degasing the mixture, and applying the mixture to the fiber as drawn while keeping it cold to delay gelation or cure.

For high volume production, an alternative and preferred method is an on-line two-package coating process. This process forms no part of the present invention, but is described and claimed in a copending, commonly assigned U.S. patent application, Ser. No. 229,444, filed by M. B. Cain et al. concurrently herewith. The process encompasses the continuous on-line mixing and supply, directly to the fiber coater, of the two-part silicone polymer to be used. The rate of continuous mixing and supply is directly controlled by the rate of application of the polymer to the fiber.

Figure 2:
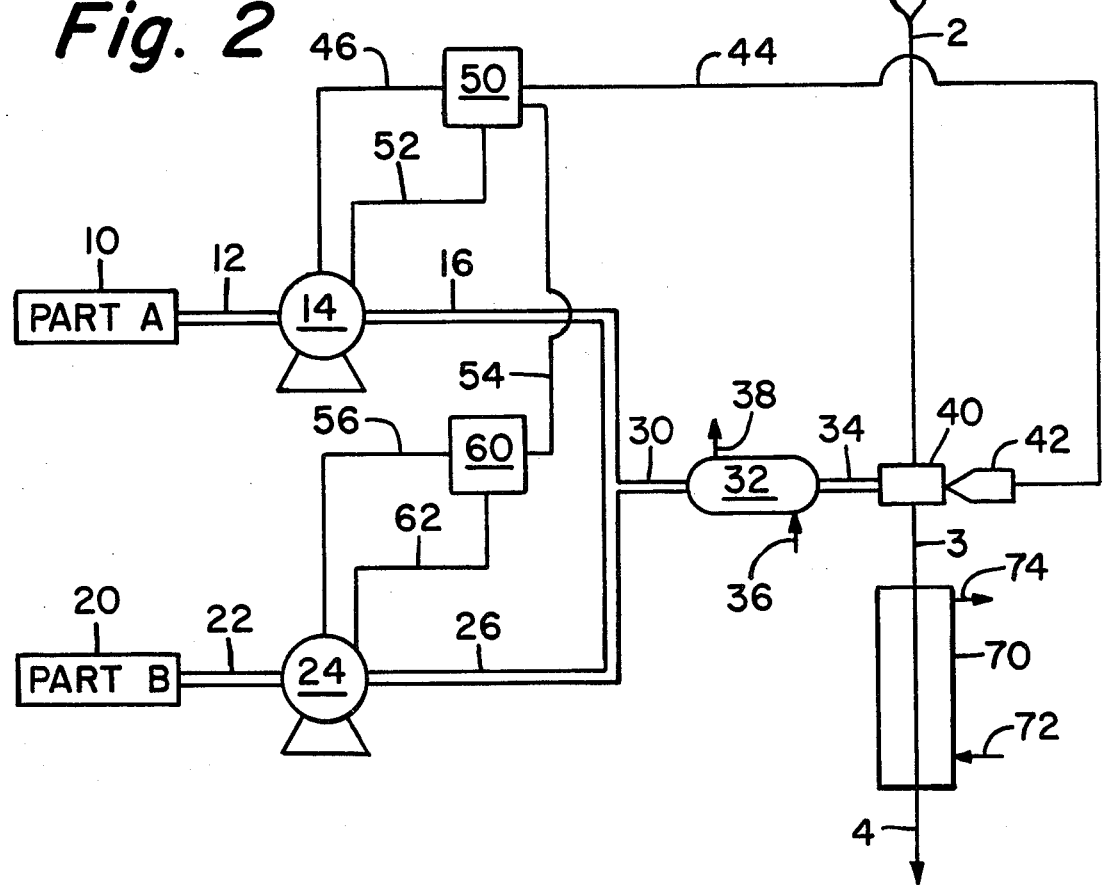
FIG. 2 is a schematic diagram of apparatus useful for applying silicone coatings to optical fibers in accordance with the invention.

Apparatus for the two-package on-line coating of optical fibers in accordance with this latter process is schematically illustrated in FIG. 2 of the drawing. As shown in FIG. 2, liquid Part A of a selected two-package silicone polymer system is drawn from reservoir 10 through supply line 12 int precision positive displacement metering pump 14 and via pump 14 through conduit 16 to input 30 for static mixer 32. At the same time, liquid Part B of the selected polymer system is drawn from reservoir 20 through supply line 22 into precision positive displacement metering pump 24 and via pump 24 through conduit 26 to input 30 for the static mixer 32.

Static mixer 32 operates to thoroughly mix Parts A and B of the silicone polymer system to form a reactive liquid mixture which is continuously supplied through mixer output conduit 34 to coater 40 (a liquid coating die). The liquid mixture is then applied to optical fiber 2 as drawn from glass preform 1 to produce liquid-coated optical fiber 3. Thereafter, liquid-coated optical fiber 3 passes through oven 70 where the liquid coating is thermally cured to produce silicone-polymer-coated fiber 4.

The rate of mixing and supply of the reactive liquid mixture to the coater 40 is controlled by feedback from a pressure transducer 42 attached to coater 40. As the mixture is depleted by application to the fiber, the pressure drop in coater 40 is sensed by transducer 42 and a feedback signal is transmitted via signal line 44 to a flow controller 50, which may be, for example, a PID controller. Also input to controller 50 via signal line 46 is a fluid flow rate signal from metering pump 14. Based on the feedback control signals on lines 44 and 46, flow controller 50 outputs a control signal via control line 52 to metering pump 14 to control the motor drive (not shown) on the pump, thus controlling the flow of Part A liquid through the pump to static mixer 32. In this way, a selected fluid pressure in coater 40 in response to input from pressure transducer 42 is maintained.

The flow of liquid Part B to the mixer is also controlled by feedback signals, those signals being input to flow controller 60 for the control of metering pump 24. The preferred feedback signal in this case, however, is a control signal transmitted to controller 60 via signal line 54 from controller 50 for the Part A liquid component. Thus, since for any selected polymer system the relative proportions of the Part A and Part B liquids are fixed, the flow rate for the Part B component is most conveniently controlled by the flow rate of the Part A component. Alternatively, of course, the coater pressure feedback signal on control line 44 could be directly used by controller 60.

In addition to the feedback signal on line 54 from controller 50, controller 60 also receives a feedback signal on line 56 from metering pump 24 which is proportional to the flow rate of the Part B liquid through metering pump 24. In response to these signals, output signal 62 from controller 60 controls the motor drive (not shown) on metering pump 24, thereby controlling the flow of Part B liquid to the mixer.

Desirably, static mixer 32 is jacketed so that the temperature of the mixer and liquid therein may be controlled. In the apparatus of FIG. 2, a temperature control fluid such as water may be passed through the jacket via fluid input and output conduits 36 and 38, respectively. Also, as is well known, the temperature of the liquid mixture in coater 40 may be controlled by jacketing or by means of conduits (not shown) provided directly in the body of the coating die, such being useful for conducting a temperature control fluid therethrough.

In the operation of oven 70 to cure the liquid polymer coating, purge gas inlet and outlet ports 72 and 74, respectively, may be useful. These provide a convenient means for flushing oven 70 and/or maintaining a controlled curing atmosphere therein. Helium is an example of a controlled atmosphere which aids in the conduction of heat to the silicone coating to accelerate cure.

Of course the foregoing represents only a commercially preferred method for applying the silicone coating to the optical fiber. Obviously, alternative application techniques involving conventional batch methods for preparing and applying the silicone could instead be used.

Following the application of the silicone coating as above described, and where the block copolymer overcoating is to be immediately applied over the silicone before the silicone coating contacts any other material, it is important to cool the silicone-coated fiber. If this is not done the overcoating is more difficult to apply and cosmetic defects in the form of waviness in the coating can appear. Sufficient cooling can readily be achieved utilizing fiber cooling apparatus which is well known in the art.

In contrast to the chemical curing process required for the silicone undercoating, the curing process for the block copolymer overcoating is simply by solvent evaporation. This evaporation is most conveniently carried out in a forced gas curing furnace. A proper balance between gas flow and furnace temperature aids in achieving a cosmetically suitable coating. During the initial stages of evaporation, low heat and high gas flow are preferred. The high gas flow helps to physically remove the solvent molecules in the gas phase from the coating interface. This effectively maintains the non-equilibrium condition which drives the evaporation process.

During the later stages of evaporation, more heat is used in order to give the solvent molecules trapped in the coating enough kinetic energy to allow rapid migration through the film to the coating gas interface, where evaporation can occur. However overheating should be avoided since such can cause solvent molecules to go into the gas phase in the body of the coating rather than at the gas-coating interface. This can lead to defects such pin holes and blisters in the coating.

The invention may be further understood by reference to the following working example.

EXAMPLE 1

A thermally curable two-package silicone elastomer is selected for application as a primary coating to an optical fiber. The silicone selected is a silica-hydride-cured alkene, commercially available as Sylgard ™ 184 silicone elastomer system from the Dow Corning Corporation of Midland, Mich.

The optical fiber to be coated is a glass optical fiber comprising a high-refractive-index glass core, a glass cladding somewhat lower in refractive index than the core, and a thin outer glass layer on the cladding having a relatively high refractive index to optically isolate the fiber cladding from the silicone coating to be applied thereto. The optical fiber has an outer diameter of approximately 125 microns. All of the glasses making up the optical fiber are of fused silica or doped fused silica composition, the thin outer glass layer being formed of a TiO$_2$-doped fused silica glass.

To apply the two-part silicone elastomer coating to this optical fiber as drawn, coating apparatus as described above and in FIG. 2 of the drawing is used. Referring to the drawing, resin Part A is fed to the apparatus through supply line 12, while curing agent Part B is fed to the apparatus through supply line 22.

During the process of coating the fiber, coolant liquids are fed through the jacketing of static mixer 32 and through conduits in the body of coater 40 to maintain the temperature of the mixture of the Part A and Part B components at a temperature of approximately 25° C. The pumping rates on metering pumps 14 and 24 are adjusted to provide a flow rate through static mixer 32 and coater 40 sufficient to provide a liquid coating slightly in excess of 50 microns in thickness on the surface of the fiber, thus to achieve an outer diameter of approximately 230 microns for the fiber with cured silicone coating.

The liquid-coated fiber thus provided is next drawn through a curing furnace being maintained at a temperature of approximately 500° C. and wherein a helium atmosphere is provided. These conditions are effective to assure complete cure of the silicone polymer coating at the point of exit of the fiber from the furnace.

Following exit from the furnace, the silicone-coated fiber is passed through a conventional optical fiber cooling tube (not shown in the drawing). This achieves a reduction in the surface temperature of the silicone-coated fiber to approximately the temperature of the silicone-polyimide liquid coating to be subsequently applied, in this case approximately 25° C.

The application of the silicone-polyimide block copolymer overcoating to the silicone-coated fiber is accomplished utilizing conventional liquid coating apparatus. This apparatus is be positioned immediately below the cooling tube so that the second coating is applied over the silicone coating immediately after the silicone-coated fiber exits the cooling tube. Like coater 40, the block copolymer coater is again a coating die assembly of the type shown in U.S. Pat. No. 4,531,959.

The silicone-polyimide block copolymer used is Siltem ™ Copolymer 87-73, commercially obtainable from the General Electric Company, Waterford, N.Y. This copolymer is sold in the form of an undiluted solid resin. For convenient application to the fiber, it is first dissolved in toluene to provide a resin solution consisting of about 10% resin and 90% toluene by weight. This solution is then applied to the fiber by the coater at a resin solution flow rate sufficient to provide a cured coating approximately 10 microns thick over the silicone base coating.

The optical fiber with applied liquid coating is next transported into a forced gas curing furnace to remove the solvent therefrom, thus to cure the coating. The furnace comprises an upper zone which is maintained at a temperature of 150° C. and wherein a flow of helium gas at a rate of about 10 liters/minute is maintained to speed solvent volatilization. After passage through the upper zone the fiber passes through a lower zone in the furnace wherein the temperature is maintained at about 600° C., again in an atmosphere of helium. This heating is sufficient to cure the block copolymer coating on the fiber.

After exit from the furnace the fiber is finally collected by winding onto a drum, and is thereafter tested for properties. The fiber is found to exhibit excellent resistance to heat degradation while retaining all of the optical properties such as resistance to bending loss and resistance to light propagation by the cladding which are necessary for proper fiber operation in an optical communications system. Further, the combination coating is non-tacky and exhibits other physical and handling characteristics such that the coated fiber can easily be rewound for testing, cabling or any other post-manufacture processing of the kind to which coated optical fibers are customarily subjected.

Of course, the foregoing Example and description are intended merely to illustrate presently preferred formulations and procedures for use in the practice of the invention, and numerous modifications and variations upon the materials and techniques specifically described herein may be resorted to by those skilled in the art within the scope of the appended claims.

I claim:

1. A glass optical fiber having at least two protective polymer coatings disposed on the outer surface thereof wherein the polymer coatings comprise a silicone-polyimide block copolymer layer bonded to the exterior surface of a silicone polymer layer.

2. A glass optical fiber in accordance with claim 1 which comprises a glass core and a glass cladding, and wherein the silicone polymer layer is disposed on the exterior surface of the glass cladding.

3. A glass optical fiber in accordance with claim 2 wherein the glass cladding comprises an outer glass layer and an inner glass region, and wherein the outer glass layer has a higher refractive index than the inner glass region.

4. In a silicone-coated optical waveguide comprising a glass optical fiber and one or more polymer coatings on the optical fiber, at least one of the polymer coatings consisting essentially of a silicone coating, the improvement wherein the silicone coating is provided with a polymer overcoating consisting essentially of a silicone-polyimide block copolymer.

5. A silicone-coated optical fiber in accordance with claim 4 wherein the glass optical fiber comprises a glass core and a glass cladding, and wherein the silicone coating is disposed on and in contact with glass cladding.

6. A method for treating an optical fiber having an exterior silicone coating to improve the handling characteristics thereof which comprises the step of applying to the exterior silicone coating a polymer overcoating consisting essentially of a silicone-polyimide block copolymer coating.

7. A method in accordance with claim 6 wherein the silicone-polyimide block copolymer overcoating is applied to the exterior silicone coating before the silicone coating contacts any solid or liquid material other than the silicone-polyimide block copolymer.

8. A method in accordance with claim 7 wherein the silicone-polyimide block copolymer overcoating is applied as a solution of a silicone-polyimide resin in a volatile solvent.

9. A method in accordance with claim 7 wherein the silicone-polyimide block copolymer is applied by melt extrusion.

* * * * *